United States Patent
Cioffi

(10) Patent No.: US 7,573,943 B2
(45) Date of Patent: Aug. 11, 2009

(54) INTERFERENCE CANCELLATION SYSTEM

(75) Inventor: John M. Cioffi, Atherton, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 552 days.

(21) Appl. No.: 10/922,705

(22) Filed: Aug. 20, 2004

(65) Prior Publication Data

US 2006/0039454 A1    Feb. 23, 2006

(51) Int. Cl.
H04K 1/10    (2006.01)
(52) U.S. Cl. .............. 375/260; 375/222; 375/257; 375/346; 375/332; 379/406.01; 379/90.01; 725/111; 725/709; 725/710; 710/1
(58) Field of Classification Search ............ 375/222, 375/260, 346, 332, 257; 379/406.01, 90.01; 725/111, 709, 710; 710/1
See application file for complete search history.

(56) References Cited

U.S. PATENT DOCUMENTS

| | | | |
|---|---|---|---|
| 5,995,567 A | 11/1999 | Cioffi et al. | |
| 6,035,000 A | 3/2000 | Bingham et al. | |
| 6,330,275 B1 | 12/2001 | Bremer | |
| 6,760,847 B1 | 7/2004 | Liu et al. | |
| 6,763,061 B1 | 7/2004 | Strait et al. | |
| 7,130,335 B1 * | 10/2006 | Cheng et al. | 375/222 |
| 7,187,711 B1 * | 3/2007 | Kantschuk et al. | 375/222 |
| 2001/0050987 A1 * | 12/2001 | Yeap et al. | 379/399.01 |
| 2002/0072331 A1 | 6/2002 | Fischer et al. | |

(Continued)

FOREIGN PATENT DOCUMENTS

EP    0 785 636 A    7/1997

(Continued)

OTHER PUBLICATIONS

Cioffi et al.; "Analog RF cancellation with SDMT," ANSI Contribution TIE1.4/96-084; Apr. 1996 (9 pgs).

(Continued)

*Primary Examiner*—Shuwang Liu
*Assistant Examiner*—Helene Tayong
(74) *Attorney, Agent, or Firm*—Gregory D. Caldwell; Blakely Sokoloff Taylor & Zafman

(57) ABSTRACT

A DSL or other communication system includes a modem or other communication device having at least one antenna that is configured to collect interference data relating to interference noise affecting communication signals being received by the communication device. The interference may include RF interference, such as AM radio interference, crosstalk and other types of interference from various sources. The interference data collected by the antenna is used by an interference canceller to remove and/or cancel some or all of the interference affecting received signals. In some embodiments of the present invention, more than one antenna may be used, wherein each antenna can collect interference data pertaining to a single source of interference noise. Where a modem or other communication device is coupled to multiple telephone lines, only one of which is being used as the active DSL line, wires in the remaining telephone lines or loops can be used as antennas. Moreover, the antenna may be an antenna, per se, such as a compact AM radio antenna or any other suitable structure or device for collecting the type(s) of interference affecting signals received by the communication device.

32 Claims, 9 Drawing Sheets

U.S. PATENT DOCUMENTS

2006/0109779 A1* 5/2006 Shah et al. .................. 370/201

FOREIGN PATENT DOCUMENTS

WO    WO 2006/051359    5/2006

OTHER PUBLICATIONS

Cioffi et al.; "Analog RF cancellation with SDMT (084)," Amati Communications PowerPoint presentation; Apr. 22, 1996 (9 pgs).

International Search Report, International Application No. PCT/IB2005/002318 (4 pgs).

Written Opinion of the International Searching Authority, International Application No. PCT/IB2005/002318 (6 pgs).

T. Greene, "Why ADSL and AM Radio Are At Odds," Nov. 22, 1999, Network World (1 pg).

T. Greene, "AM Radio Creates ADSL Static," Nov. 22, 1999, Network World (2 pgs).

* cited by examiner

INTERFERENCE CANCELLATION SYSTEM

CROSS-REFERENCE TO RELATED APPLICATIONS

This application is related to U.S. Ser. No. 10/808,771, entitled "HIGH SPEED MULTIPLE LOOP DSL SYSTEM" and filed Mar. 25, 2004, the disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

1. Field of the Invention

This invention relates generally to methods, systems and apparatus for managing digital communications systems. More specifically, this invention relates to the use of a functional antenna in connection with a DSL modem or the like to reduce the deleterious effects of RF interference, including AM radio noise, on DSL and/or other data signals.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication. In particular, asymmetric DSL (ADSL) and very-high-speed DSL (VDSL) can adapt to the characteristics of the subscriber line by using a discrete multitone (DMT) line code that assigns a number of bits to each tone (or sub-carrier), which can be adjusted to channel conditions determined during initialization and subsequent on-line training known as "bit-swapping" of the modems (typically transceivers that function as both transmitters and receivers) at each end of the subscriber line.

ADSL service uses frequencies in the range of 138 KHz to 1.1 MHz for operation. Nearly 5,000 AM radio stations in the United States use frequencies in the range of 540 KHz to 1.7 MHz. These radio signals permeate many areas, including areas in which users have DSL modems in operation. The sizable overlap in frequencies usage can create problems for DSL users. In addition, other sources of radio frequency (RF) interference can contribute to a deterioration in DSL system performance as a result of the interference they cause. Finally, other types of interference also can interfere with data signals sent on DSL and other communication systems, such as crosstalk, impulse noise and other man-made electronic radiation.

RF interference does not distort the entire spectrum identified above. Instead, many sources, such as AM radio stations, affect only a very narrow portion of the frequency spectrum. ADSL uses 128 or 256 carriers, each of which is a discrete segment of the frequency spectrum about 4.3125 kHz wide. Because the ADSL system blocks the transmissions into packets or symbols of information that are 250 microseconds in length, there is a windowing effect that causes the receiver to see RF interference within tens to hundreds of kilohertz of the center of each and every carrier used in the ADSL system. Theoretically, 5 KHz wide RF AM radio interference would tend to affect only 2-3 ADSL carriers, but the windowing effect leads to each AM radio station possibly affecting anywhere from several to tens of carriers.

In many prior systems, the modem affected by RF interference at a given carrier merely stops using the affected carriers or at least reduces the number of bits the modem carries in the vicinity of the RF interference, which lowers the performance of the DSL system. The effect is especially pronounced when the interference is present at the end of a long DSL line. Signals that have been attenuated significantly during transmission can be completely overcome by RF interference at a customer's premises. While twisting of the transmission loop wires mitigates some of the ingress of RF interference, it nevertheless represents a significant problem. As the frequency band used by the DSL system increases (for example, ADSL2+, VDSL), the twisting or balance of the twisted pair becomes less effective so that the higher the frequency of the RF ingress, the larger its coupling into the pairs. Furthermore, higher frequencies on a twisted pair tend to be the most attenuated, and so are more susceptible to distortion by the crosstalk at higher frequencies.

In particular, RF interference often couples most strongly to telephone lines between customers' premises and pedestals (service terminals) and the like. Pedestals offer a cross-connection point between lines going from a central office (or remote terminal central office) to a specific customer premises or a few customer premises (often referred to as a "drop"). The remainder of lines from the CO may continue to other pedestals. Typically, there are 2-6 lines in the "drop" segment to each customer, providing extra copper for the contingency of one or more customers later demanding multiple phone services. The relatively exposed DSL transmission loop segment running between the pedestal and customer premises acts as an antenna, picking up the RF interference signals, especially the AM radio broadcasts in the area. This segment of the line may experience vertical runs of the line that tend to act as higher gain antennas to the RF signals. Additionally, this last segment is often not well shielded or employs shields that are not well grounded, leading to additional gain in receipt of RF signals by the telephone line(s).

Systems, methods and techniques that permit improved removal of noise caused by RF interference would represent a significant advancement in the art.

BRIEF SUMMARY OF THE INVENTION

A DSL or other communication system includes a modem or other communication device having at least one antenna that is configured to collect interference data relating to interference noise affecting communication signals being received by the communication device. The interference may include RF interference, such as AM radio interference, crosstalk, impulse noise and other types of man-made electronic radiation and/or interference from various sources. The interference data collected by the antenna is used by an interference canceller to remove and/or cancel some or all of the interference affecting received signals. In some embodiments of the present invention, more than one antenna may be used, wherein each antenna can collect interference data pertaining to a single source of interference noise. Where a modem or other communication device is coupled to multiple telephone lines, only one of which is being used as the active DSL line, wires in the remaining telephone lines or loops can be used as antennas. Moreover, the antenna may be an antenna, per se, such as a compact AM radio antenna or any other suitable structure or device for collecting the type(s) of interference affecting signals received by the communication device.

More specifically, a modem or other communication device can use antenna means to collect interference data relating to interference noise affecting signals received by the communication device. The antenna means, which may be one or more antennas and/or wires coupled to the communication device, provides the interference data to interference canceling means in the communication device. Such canceling means can include appropriate analog to digital converters, delay blocks or modules, adaptive filters and subtractors for treating received signals and interference data from the one or more antennas. Once the interference noise has been completely or partially removed or canceled from the received signals, the remaining data can be processed in any suitable way by the communication device.

Where a DSL modem is the communication device, multiple telephone lines or loops may be coupled to the modem, providing extra wires that are part of active or inactive telephone and/or DSL lines. These extra wires can serve as antennas for collecting RF interference data, crosstalk interference data, etc. Each additional wire can collect interference data from a single interference noise source and provide that interference data to the interference canceller. Wires that are part of a drop segment from a pedestal to a customer's premises equipment can be especially effective antennas because they are generally replicas of the active DSL or other communication line that is part of the same drop segment.

Further details and advantages of the invention are provided in the following Detailed Description and the associated Figures.

BRIEF DESCRIPTION OF THE SEVERAL VIEWS OF THE DRAWING

The present invention will be readily understood by the following detailed description in conjunction with the accompanying drawings, wherein like reference numerals designate like structural elements, and in which.

DETAILED DESCRIPTION OF THE INVENTION

Figure 1:
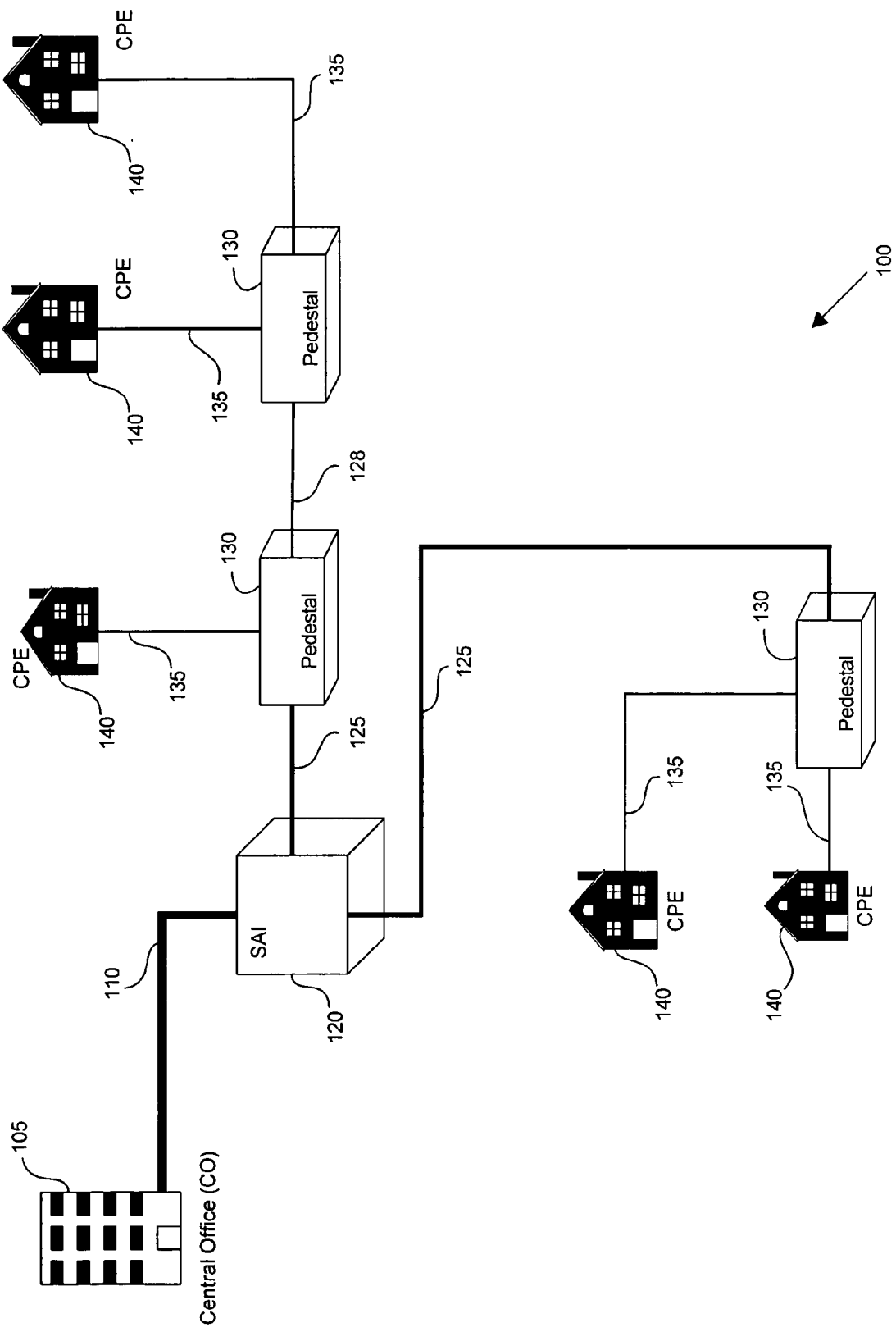
FIG. 1 is a diagram of a typical DSL plant.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited illustrative and exemplary embodiments.

Embodiments of the present invention provide a modem, or other communication device having data signals susceptible to noise from RF and/or other interference sources (including, for example, impulse noise, crosstalk and other man-made electronic radiation), that uses an antenna (or other structure functioning like an antenna) to obtain data relating to RF and/or other interference present in the environment in which the modem and/or any unshielded or poorly shielded portion(s) of the DSL loop operate. In some embodiments, an antenna, per se, is used. In other embodiments, one ore more wires available for other functions also serve as one or more antennas. For example, when multiple telephone wires are used as part of the drop from a pedestal or other link to a customer premises, wires in unused and/or inactive DSL lines can be used instead as one or more antennas. In some modems, the inactive lines may nevertheless be coupled to the modem as they would be if they were active. The phrases "coupled to" and "connected to" and the like are used herein to describe a connection between two elements and/or components and are intended to mean coupled either directly together, or indirectly, for example via one or more intervening elements or via a wireless connection, where appropriate.

An antenna used in connection with the present invention collects interference data relating to its environment (for example, RF interference from AM radio signals, crosstalk induced by nearby lines, etc.) and provides that data to an interference canceller or filter that uses the interference data to remove interference noise from DSL or other communication signals. As will be appreciated by those skilled in the art, when two sources of signal data (for example, user payload data and noise) are transmitted on a given line, a second line containing one set of that data (for example, the noise alone) allows the removal of that data from the mixed signal. Where user payload data and interference data are present in a given DSL line, the ability to collect the interference data using embodiments of the present invention allows the accurate and relatively complete removal of the interference data, yielding a much more accurate representation of the user payload data. The removal of the interference data may occur in a receiver, after receipt of the mixed data signal.

The present invention can be used in a variety of locations to remove various types of environmental interference sources. Some embodiments of the present invention, particularly useful in connection with customer premises and RF interference, especially AM radio interference, are presented herein as examples but are not intended to be limiting in any way. Moreover, while embodiments of the present invention are explained in connection with one ore more types of DSL systems, other communication systems may benefit from the present invention as well and are intended to be covered by the present invention.

The term subscriber loop or "loop" refers to the loop that is formed by the line that connects each subscriber or user to the central office (CO) of a telephone operator (or possibly a remote terminal (RT) of such an operator). A typical topology 100 of a DSL plant is presented in FIG. 1. As can be seen, a CO 105 provides high bandwidth transmission via a feeder 110 (which can be a high-bandwidth link, such as fiber optic cable, or a binder with a number of copper lines running through it). The feeder 110 may connect the CO 105 to a serving area interface (SAI) 120 (which may, for example, be an optical networking unit or ONU). From interface 120, a number of copper lines 125 may then extend to a pedestal 130 near one or more customer premises equipment (CPE) locations 140. Such pedestals are common on each block of a street or neighborhood, for example. In some cases, pedestals are intermediate points between a CO, SAI and/or other pedestals. For example, in FIG. 1, an inter-pedestal link 128 continues lines that do not divert to the line(s) 135 of a customer 140 on to another pedestal and thus subsequently to one or more other CPEs.

Figure 2:
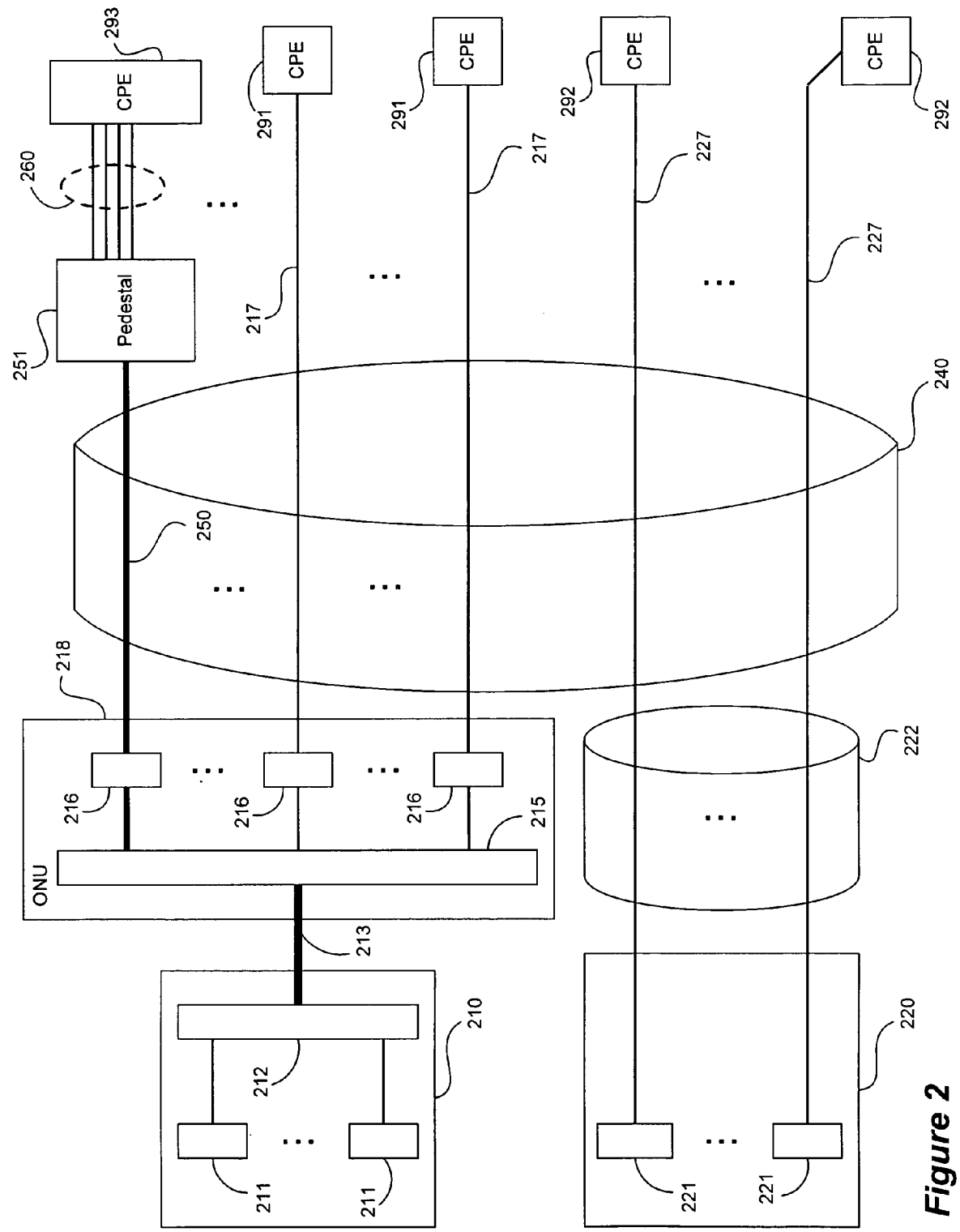
FIG. 2 is a schematic diagram showing a generic DSL deployment in which embodiments of the present invention can be used.

Pedestals offer a cross-connection point between lines going to one or more customer premises (often referred to as a "drop") and the remaining lines that may continue to other pedestals. Typically, there are 2-6 lines in the "drop" segment to each customer, providing extra copper for the contingency of one or more customers later demanding multiple phone services. The cable back to the ONU or central office usually does not have 2-6 times as many phone lines as would be needed by all the customers (because not all customers would have demanded that many phones). However, the pedestal drops typically have extra copper. A customer's modem can be connected to extra lines for a number of reasons (for example, future bonding and/or vectoring of lines and/or signals, cancellers such as those covered by embodiments of the present invention, selection of a best line by the modem if the lines actually are connected all the way back, etc.) This extra copper may be exploited in some embodiments of the present invention when extra wires and/or lines are used as the antenna(s) for the modem. To further illustrate a generic DSL deployment, FIG. 2 shows two sources of data signals 210, 220 (for example, DSLAMs and the like) providing services to a number of users/CPEs 291, 292, 293 via a series of feeders and other communication lines 213, 217, 227, 250. In one case, a group of 4 loops 260 are dropped from pedestal 251 to CPE 293. The drop of loops 260 may be unshielded or may be poorly shielded, allowing the ingress of RF interference from any nearby sources (for example, home appliances) and/or strong sources (for example, AM radio).

In addition, crosstalk interference may affect signals on active DSL lines. Crosstalk is a well-known phenomenon in which unwanted interference and/or signal noise passes between adjacent lines that occurs due to coupling between wire pairs when wire pairs in the same or a nearby bundle are used for separate signal transmission. Embodiments of the present invention can be used to remove one or more significant crosstalkers in a given system, thus improving the transmission of data to a user, even though all crosstalk might not be removed.

Figure 3:
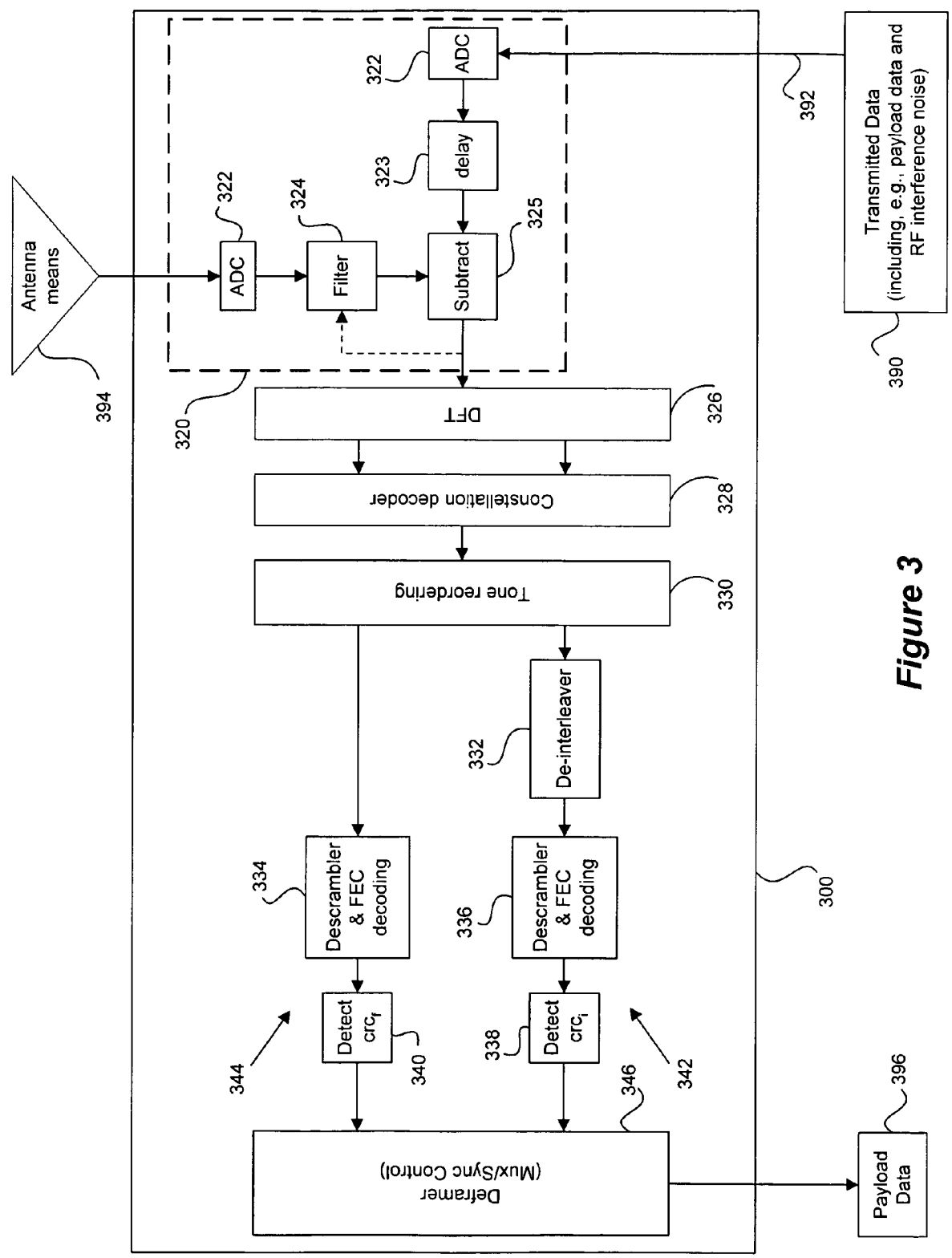
FIG. 3 is a schematic block diagram showing the relevant portions of a DSL modem operating in its receiver mode and implementing one or more methods, systems and/or other embodiments of the present invention.

A basic modem is shown in FIG. 3, incorporating one or more embodiments of the present invention. In the example of FIG. 3, the removal of RF interference is used as an exemplary interference cancellation is performed in the time domain, rather than the frequency domain. Those skilled in the art will appreciate that this facilitates cancellation of the RF interference noise because the RF interference is asynchronous. However, removal can be performed in the frequency domain in some cases, for example by treating successive DFT output block symbols in a receiver, and the invention includes RF interference cancellation in all such circumstances. As will be appreciated by those skilled in the art, the type of interference being removed may dictate or otherwise make various options more preferable than others.

FIG. 3 illustrates a remote modem, transceiver or other communication device 300 operating in its receiver mode. Communication device 300 of FIG. 3 receives transmitted data 390 using an active DSL line 392. The line 392 typically includes at least one segment that is unshielded (or poorly shielded) and thus often highly receptive to RF and other types of interference (depending on various factors known to those skilled in the art, such as the sufficiency of twisting of the wires in line 392). Thus the transmitted data 390 received by the modem 300 may very well include payload data and RF or other interference noise. The analog signal on line 392 is converted to digital data at converter 322.

Antenna means 394 may be an antenna, per se (such as an AM radio compact antenna or the like), one or more wires in a second or additional telephone/DSL line, or any other suitable device or structure configured to collect interference data relating to at least one type of interference noise affecting signals being received by the modem 300. The interference data collected by the antenna means 394 are provided to interference canceling means 320 in the modem 300. Particular structures for the interference canceling means 320 are disclosed herein, but others will be apparent to those skilled in the art, depending on the type of interference data being collected, the type of communication signals being received by the modem 300, the processing needed to use the interference data to remove some or all of the interference noise affecting signals received by the modem 300, etc.

In the example system of FIG. 3, the analog interference data received by antenna means 394 is converted from analog to digital form by a converter 322. (As will be appreciated by those skilled in the art, all of the processing described as occurring in digital signals may also be done with analog signals from line 392 and antenna 394. ADC 322 can be differentially coupled to a second line or can use a common reference such as one wire from the active line and couple to either of the wires of a second telephone line if the antenna is a wire from a second telephone line) The digital signal from antenna 394 is then filtered using an adaptive filter 324 in modem 300. The transmitted data signal may be controlled by a delay block 323 (so that the old RF interference is already in the adaptive canceller and thus renders downstream cancellation causal, as will be appreciated by those skilled in the art. The appropriately conditioned RF interference data and transmitted data signals are then input to a subtractor 325, which can perform a simple subtraction to remove the RF interference noise from the transmitted data. The output of subtractor 325 is used to assist the filter 324 in adapting the signal from antenna 394. Embodiments of the present invention might use a digital tapped-delay-line filter whose coefficients are adapted by well-known adaptive algorithms such as the LMS algorithm (perhaps with leakage to allow for the narrow-band input and possible instability). Such filters are well known to those skilled in the art. See, for example, Maurice Bellanger, Adaptive Digital Filters, Marcel Dekker, 2001, New York, Chapters 4-7.

Embodiments of the present invention use the RF interference data collected by the antenna 394 to remove noise in the transmitted data 390 that is caused by RF interference in the frequency range used to transmit data downstream to modem 300. In the case of the most common forms of ADSL, for example, this would include RF interference in the range of 138 kHz to 1104 MHz. This naturally would include AM radio interference found in the band of 540 KHz to 1.1 MHz. Some forms of ADSL move the downstream start frequency, which typically is 138 kHz, as low as 0 Hz and as high as 200-300 kHz. Some forms of ADSL, most notably ADSL2+, move the downstream end frequency as high as 2.208 MHz while VDSL may move this frequency to 8.832 MHz, 17.668 MHz or even as high as 30-36 MHz. These extended bands could include AM radio interference found in the band of 540 kHz to 1.6 MHz as well as amateur radio bands at 1.8-2.0 MHz, 3.5-4 MHz, 7.0-7.1 MHz and several others at higher frequencies.

Those skilled in the art also will appreciate that other sources of RF interference might be present, including but not limited to radio beacons used for navigational purposes, long-wave radios and a variety of other sources. Moreover, noise from a source of another type of noise that is not RF interference noise (for example, crosstalk from a another DSL line) could couple into the active DSL line and the "antenna" line/wire. Such noise also could be eliminated by the canceller of the present invention, even though the noise might not be described and/or characterized as an RF signal, per se. As mentioned above, the interference noise does not have to be RF noise so long as there is a single source impinging on both the active data line and the antenna. For example, one such alternative noise could be a DSL signal on a separate telephone line that couples into both the active data line and the antenna used in this invention. The number of antennas must exceed the number of noise sources at any single frequency or tone of a DMT DSL system in order for complete cancellation of any such noise to occur. Thus, if there is one antenna, one independent noise source can be cancelled at each frequency.

Once the RF interference noise has been removed, the data is sent to a discrete Fourier transform module 326, constellation decoder 328 and tone reordering module 330, all of which are well known to those skilled in the art. Data bound for the interleaved path 342 of a DSL modem is then sent to a de-interleaver 332, descrambler and FEC decoder 336 and interleaved cyclic redundancy code prefix ($crc_i$) detector 338. Similarly, data bound for the fast path 344 of modem 300 is sent to descrambler and FEC decoder 334 and fast cyclic redundancy code prefix ($crc_f$) detector 340. Finally, the data is deframed in module 346 and provided to a user as payload data 396.

Figure 4:
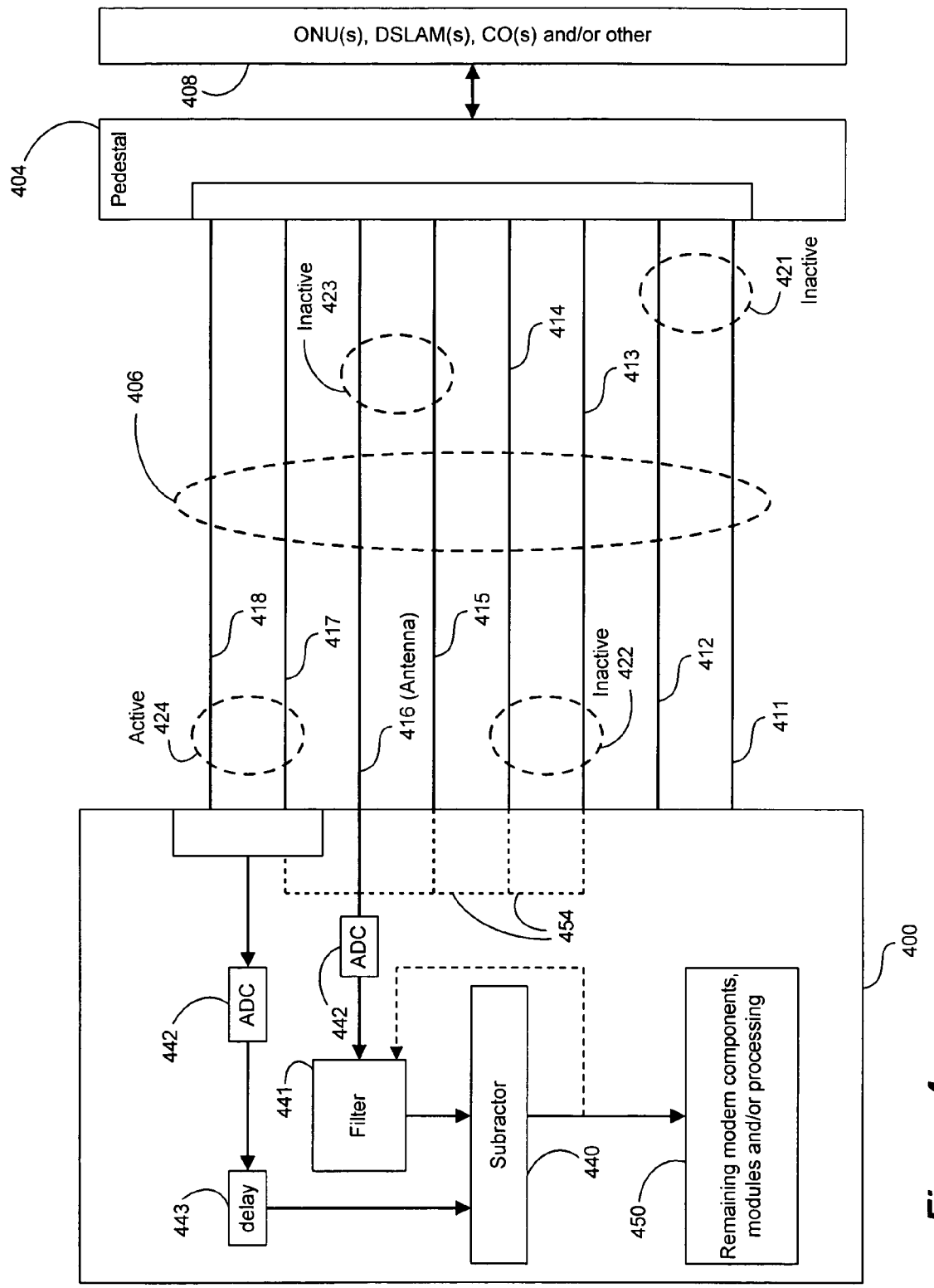
FIG. 4 is a schematic block diagram showing the relevant portions of a DSL modem operating with multiple DSL lines/ loops coupled to the mode and implementing one or more methods, systems and/or other embodiments of the present invention.

In another embodiment of the present invention, the modem is connected to multiple telephone/DSL lines, as shown, for example, in the drop 260 of FIG. 2. In such a case, one or more wires of the DSL lines connecting the CPE modem 293 to the pedestal 251 may be used as an antenna. A more detailed view of such a configuration is shown in FIG. 4, in which a modem 400 is connected to pedestal 404 by a multiple loop segment 406 comprised of 8 wires 411 through 418, which are the 8 wires of 4 loops 421, 422, 423, 424 (similar to loops in segment 260 of FIG. 2). In the example of FIG. 4, only loop 424 (using wires 417, 418) is active, loops 421, 422, 423 being inactive. Thus wires 411 through 416 are not in use for DSL communication purposes. Instead, at least one of these wires, wire 416, is used as an interference data antenna for modem 400. In this case, wire 416 is practically identical to wires 417, 418 of active loop 424 (for example, being approximately the same length and having the same orientation, possibly being the same material/type of wire, and possibly having the same amount or absence of shielding). This means that wire 416 will receive practically identical RF and/or other interference signals as those received by loop 424. As will be appreciated by those skilled in the art, if more than one source of RF and/or other interference (for example, crosstalk from one or more additional DSL lines) is present, additional inactive loops' wires can be used similarly, if desired.

The interference data collected by wire/antenna 416 and the incoming data from active DSL loop 424 is converted from analog to digital form by converters 442. Again, the interference noise data is filtered by filter 441, which bases its conditioning of the interference noise on the output of subtractor 440. The received data from loop 424 can be delayed by delay element 443. The conditioned data from loop 424 and antenna 416 is then input to subtractor 440 so that the interference noise can be removed and the remaining user data passed on to the other modem components, modules and/or processing. Additional antennas can be brought into service using other wires from inactive loops of segment 406. For example, as shown by the dashed connections 454, wires 413, 414, 415 can be employed as needed. The ADC 442 may then be more than just a single converter and may instead be any suitable conversion circuitry, as will be appreciated by those skilled in the art. Similarly, in such a case, filter 441 may be adaptive filtering circuitry, as will be appreciated by those skilled in the art.

Finally, multiple wires in segment 406 can be used to remove interference. As will be appreciated by those skilled in the art, the systems disclosed in U.S. Ser. No. 10/808,771, filed Mar. 25, 2004, entitled "High Speed Multiple Loop DSL System," incorporated by reference above, can provide extra phone lines and/or antennas and cancel interference in more than one telephone line (if they are bonded and vectored as described in the referenced '771 application). Thus, the system can be viewed as having additional lines/antennas, and again the RF or other noise and/or interference is canceled in all the lines.

In the example of FIG. 4, there are 8 wires in the segment 406, only two of which are in use, the two used for loop 424. The other 6 wires could be used as follows—wire 416 for collecting RF interference data, wires 411-415 for collecting interference data for the 5 most significant crosstalkers affecting loop 424. That is, in a system having N telephone loops or lines available, where one of the telephone loops is the active DSL line, one or more wires in the remaining N–1 loops can act as the antenna or antenna means to collect interference data. Since there are 2 wires in each loop, there are 2(N–1) wires available for collecting interference data affecting the signals received by a modem using the active DSL line. Any suitable interference canceling means can be used in connection with the antenna(s), including more than one type of interference canceling structure where more than one type of interference noise is being removed and/or canceled. Each wire can be used to remove a single source of interference noise (for example, AM radio interference, a household appliance near the segment, crosstalk, etc.). Each wire's interference data can be converted to digital form and be filtered appropriately, as will be appreciated by those skilled in the art.

Figure 5A:
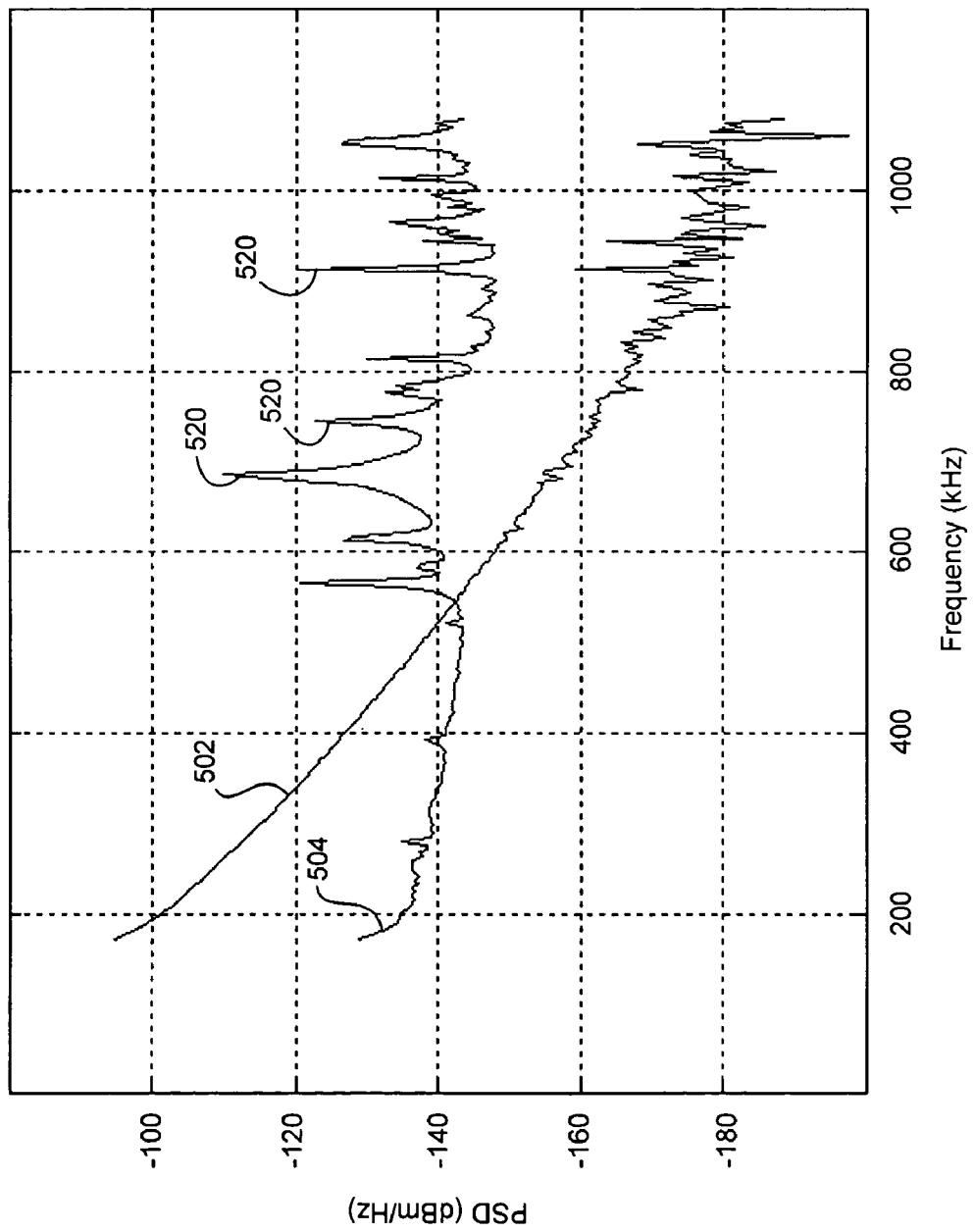
FIG. 5A is an illustration of the plots of the power spectral density of a line and the noise(s) affecting that line's data signals received by a DSL modem.
Figure 5B:
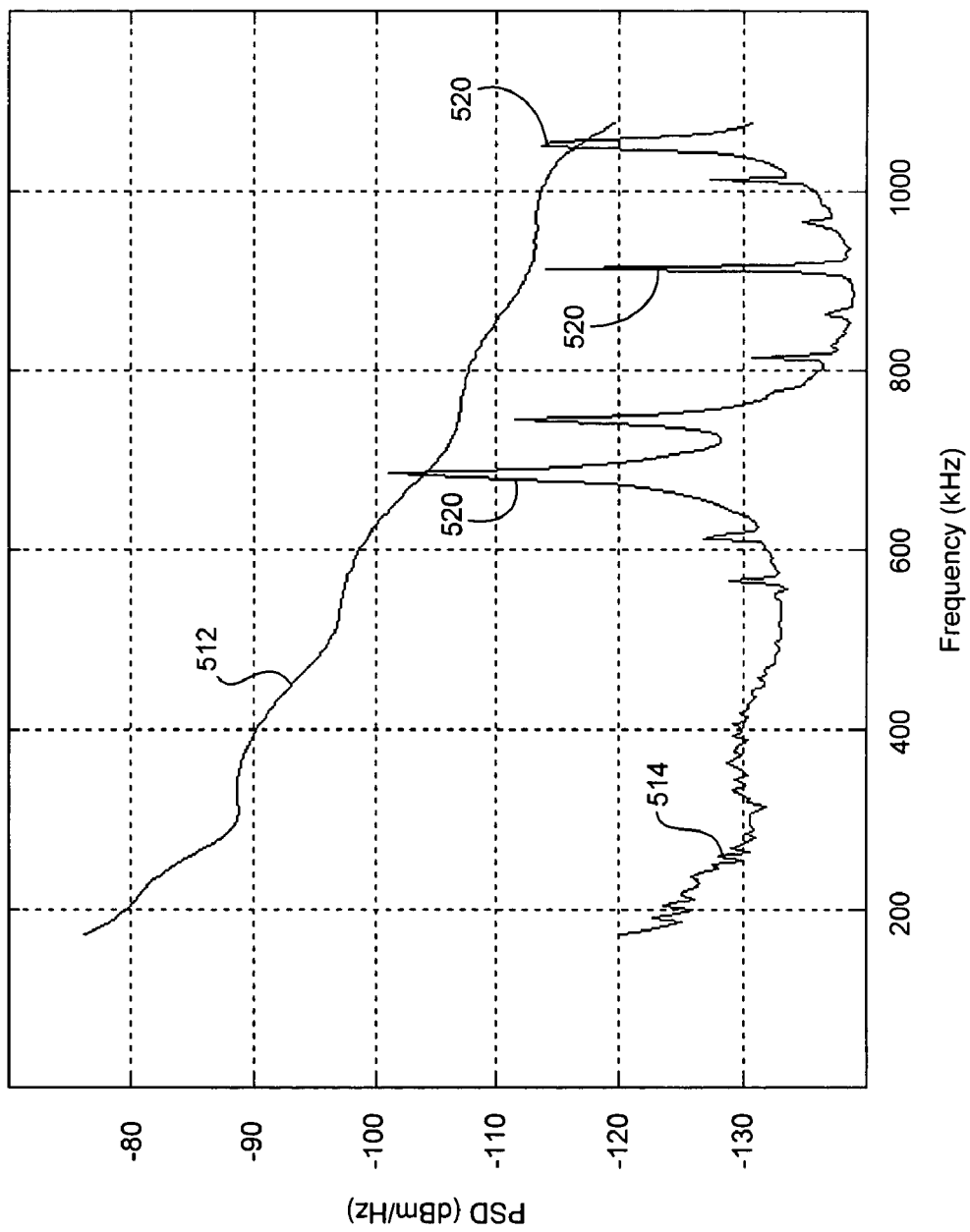
FIG. 5B is an illustration of the plots of the insertion loss of a line and the noise(s) affecting that line's data signals received by a DSL modem.

FIGS. 5A and 5B illustrate the types of data that can be collected and other data involved in embodiments of the present invention. In both FIGS. 5A and 5B the antenna used to collect interference data was a supplemental phone line/loop. FIG. 5A shows plots of the power spectral density (PSD) of the received signal 502 compared to the noise 504 present in the received data. The relatively straight line representing the signal in the lower frequencies of FIG. 5A indicates that no bridged tap is present on the line. In the example of FIG. 5A, the loop is 17,000 feet and is provisioned at 192 kbps. Using various dynamic spectrum management techniques, that line's data rate can be increased to at least approximately 768 kbps. Importantly in the context of the present invention, the effects of RF interference (primarily in the form of AM radio interference) 520 can be seen in the noise plot 504. Similarly, FIG. 5B illustrates an 8,000 foot loop provisioned at 1,536 kbps, capable of running at approximately 6,008 kbps or higher using early DSM techniques. In FIG. 5B the noise plot 514 also includes substantial RF interference 520, again caused primarily by AM radio interference. The insertion loss 512 of the loop is also plotted with the noise 514.

Figure 6:
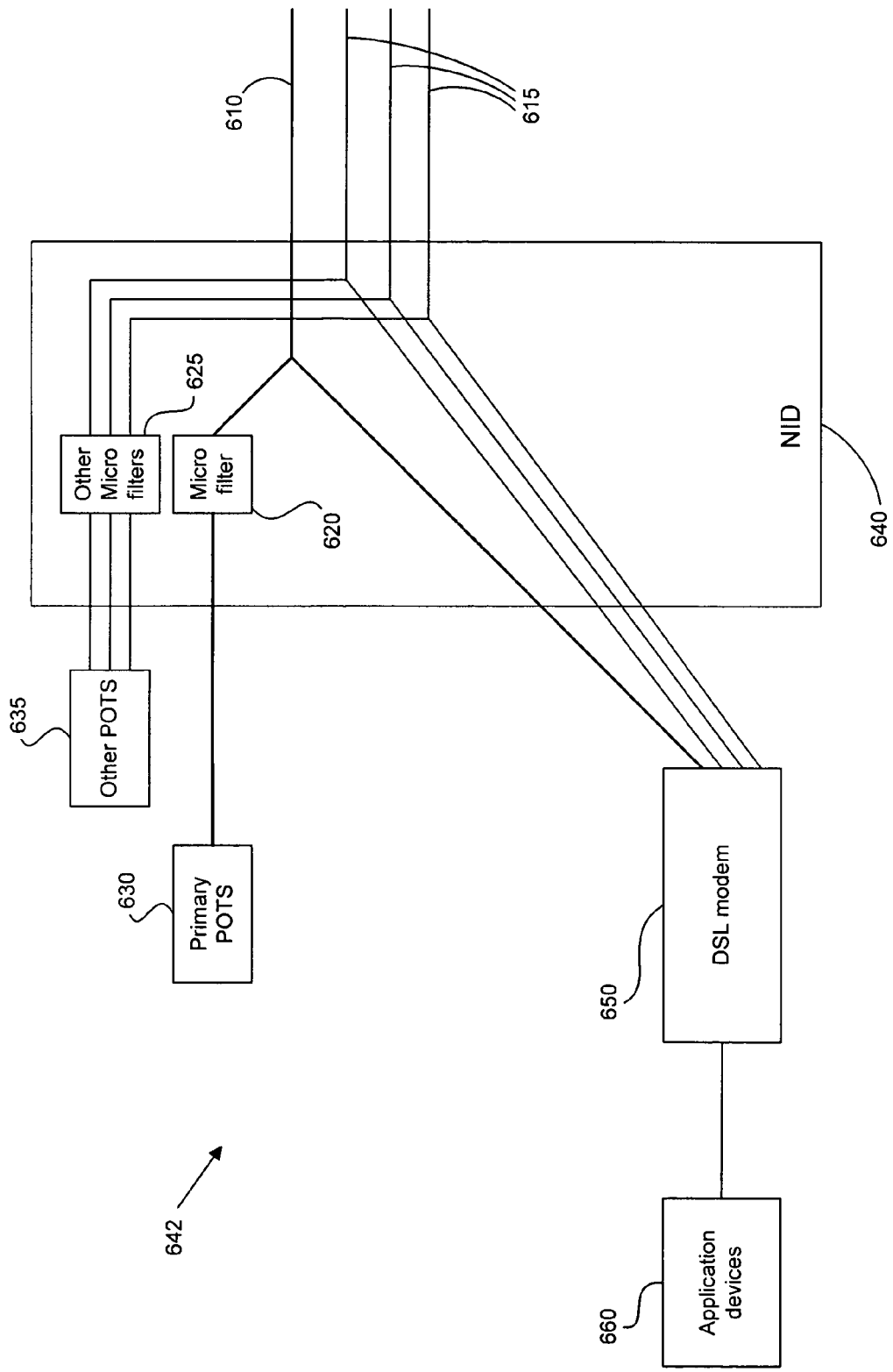
FIG. 6 is a schematic diagram of one implementation of multiple telephone lines or loops coupled to a modem that can be used in connection with embodiments of the present invention.

One specific implementation of the multiple line/loop configuration is shown in FIG. 6. A connection configuration 600 includes a primary DSL service line 610, which is filtered at filter 620 in network interface device 640 to allow DSL service to modem 650 and primary POTS service at 630. This usually isolates the primary active DSL line/loop from the premises wiring to eliminate internal bridged taps and impulse noise sources. The microfilters shown do not need to be installed, but correspond to a preferred embodiment. Additional drop wires 615 also are filtered at filter 625 and may provide additional POTS service at 635. These additional wires 615 can be coupled to the modem 650 to provide one or more antennas according to embodiments of the present invention and/or to assist in other ways (for example. eliminating premises bridged taps, facilitating multi-line bonding and/or to facilitate multi-line vectoring). The connection from the NID to the DSL modem can be at least 4, and perhaps 8, 24-gauge twisted pairs (the same as or similar to category 5 wiring used for Ethernet, for example). A connector on/in the NID can attach these twisted pairs to some or all of the drop wires entering the NID, even if the other drop wires are unused presently. All lines/loops thus terminate at the modem 650, even if fewer than all are being used for DSL service.

Figure 7:
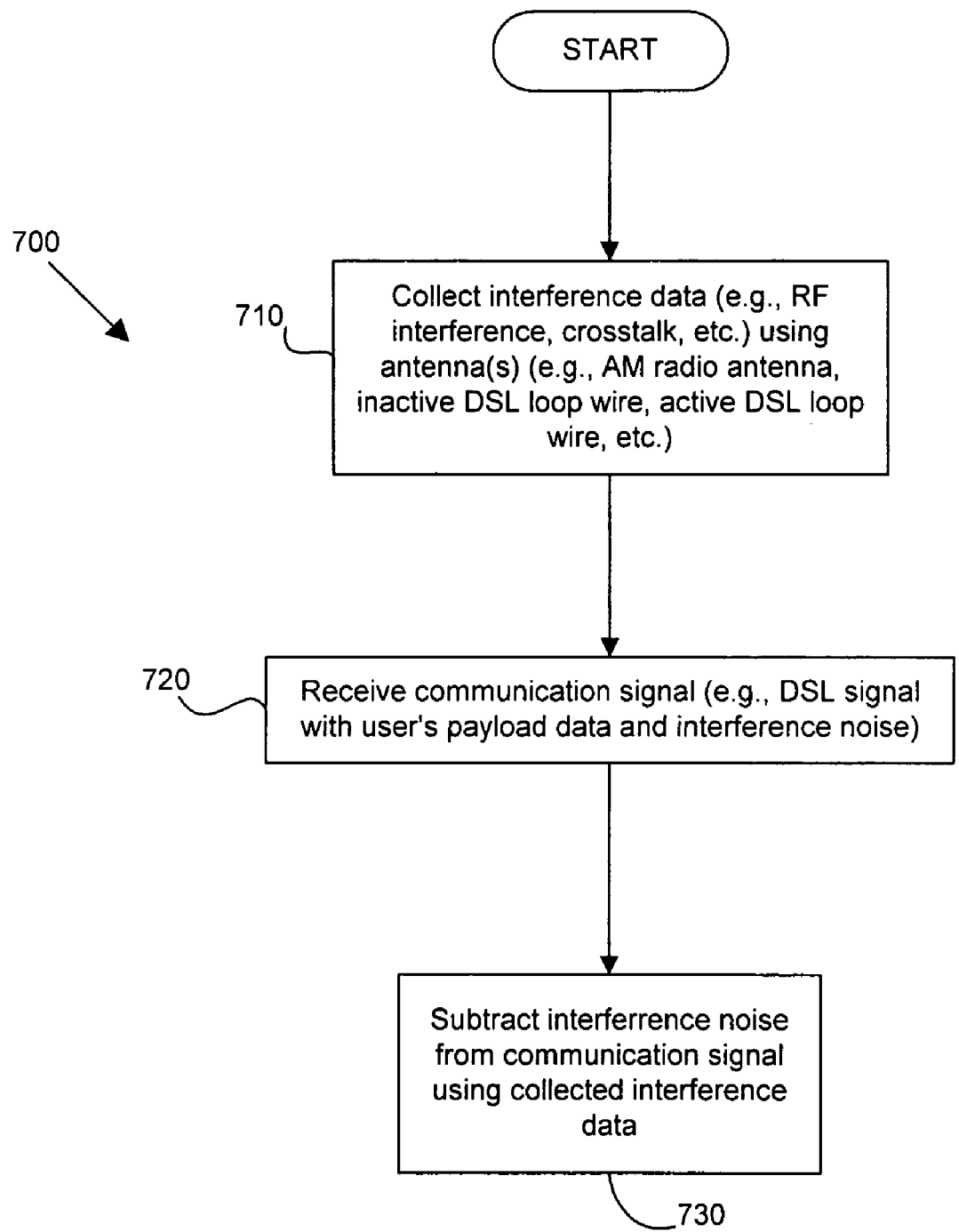
FIG. 7 is a flow diagram illustrating a method according to one embodiment of the present invention for removing RF interference from signals received by a modem.

A method for removing noise from DSL or other communication signals received by a modem or other communication device, according to one embodiment of the present invention, is shown in FIG. 7. Method 700 starts with the collection of interference data at 710 being performed by one or more suitable antennas, depending on the type(s) of interference present and the available antenna structure(s). As noted in FIG. 7, the interference may be RF interference such as AM radio signal interference, crosstalk from neighboring communication lines, or other interference. At 720 the communication signal, including the user's payload data and interference noise, is received by the communication device. Finally, at 730 some or all of the interference noise is subtracted from the received communication signal using the interference data supplied by the antenna(s). When multiple wires and/or antennas are available and more than one source of interference noise is present, method 700 may be applied iteratively or otherwise to remove more than one type and/or source of interference, either completely or partially, according to one ore more embodiments of the present invention.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
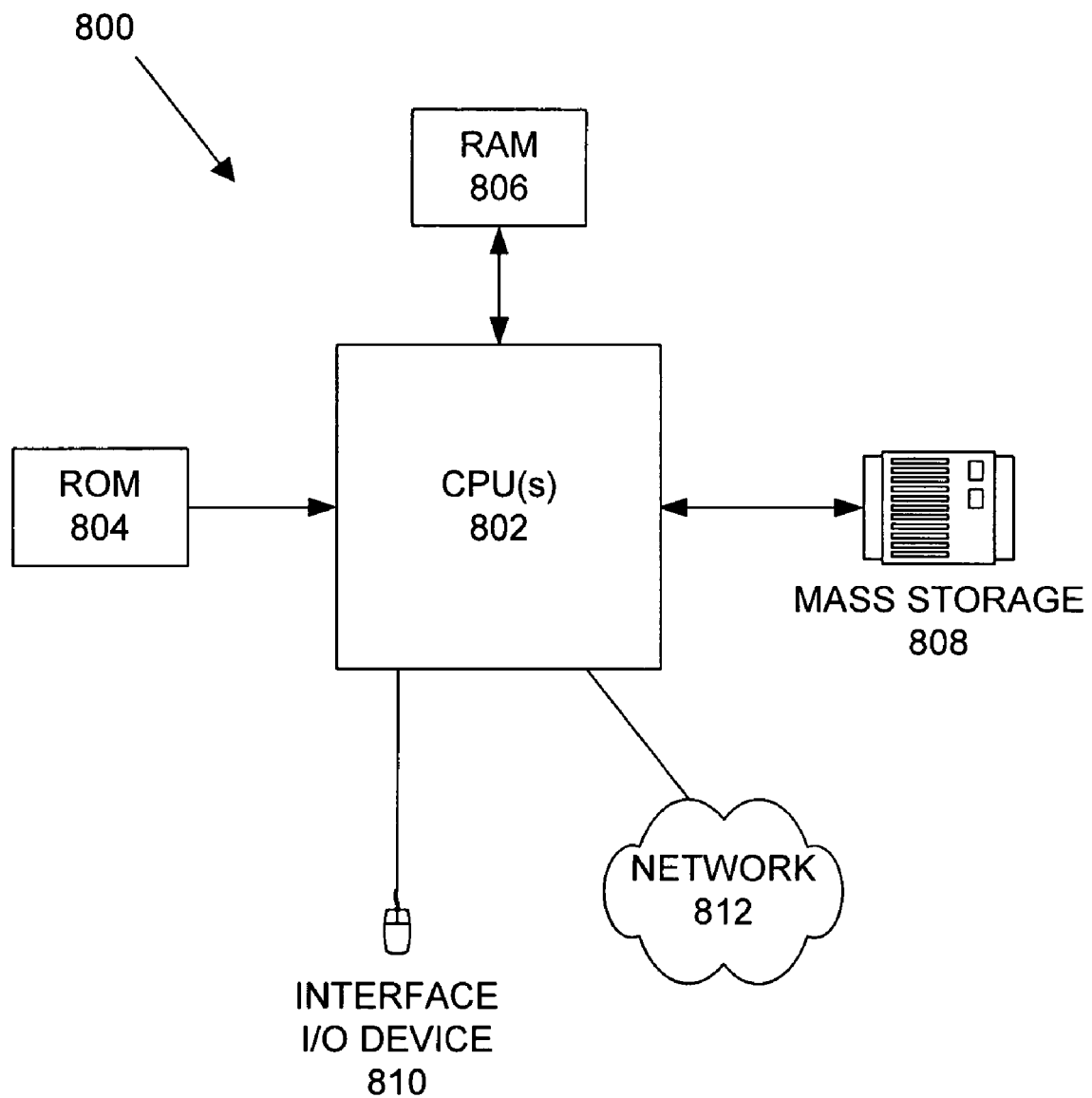
FIG. 8 is a block diagram of a typical computer system suitable for implementing embodiments of the present invention.

FIG. 8 illustrates a typical computer system that can be used by a user and/or controller in accordance with one or more embodiments of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). The CPU and some of the components of system 800 may also be implemented as an integrated circuit or chip that is a single device capable of being used in embodiments of the present invention. As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 808 or 814 and executed on CPU 802 in conjunction with primary memory 806. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A system comprising:
   a customer premises equipment (CPE) DSL modem coupled to a pedestal via a first active twisted pair telephone DSL line ("first line") to receive DSL data signals from the pedestal, the CPE DSL modem further coupled to the pedestal via a second inactive twisted pair telephone line ("second line"), wherein the first line and the second line are both part of a single drop segment coupling the CPE DSL modem to the pedestal;
   an interference collector coupled to the CPE DSL modem and to the second line to collect interference data from the second line related to interference noise carried by the second line in a frequency range used to carry the DSL data signals on the first line;
   an interference canceller coupled to the interference collector, the CPE DSL modem and the first line to subtract from the first line the interference data collected from the second line and thereby remove at least a portion of the interference noise from the first line.

2. The system of claim 1 further comprising a Radio Frequency (RF) antenna coupled to the modem to collect additional interference data.

3. The system of claim 1 further comprising a wire connected to the CPE DSL modem as an additional interference collector and wherein the interference canceller further subtracts from the first line interference data collected from the wire.

4. The system of claim 1 wherein the interference canceller comprises an adaptive filter for configuring the interference data from the second line before subtracting the interference data from the first line.

5. The system of claim 4 wherein the interference canceller further comprises frequency domain processing, and wherein the interference canceller subtracts the interference data from the DSL data signals on the first line in a frequency domain within the frequency range used to carry the DSL data signals on the first line, in accordance with the frequency domain processing.

6. The system of claim 1 wherein the interference noise comprises at least one of:
   impulse noise;
   man-made electronic radiation;
   RF interference; and
   crosstalk.

7. The system of claim 1 wherein the interference canceller to subtract from the first line the interference data collected from the second line and thereby remove at least a portion of the interference noise from the first line removes RF interference noise from the DSL data signals received by the CPE DSL modem on the first line.

8. A DSL system comprising:
   a Customer Premises Equipment (CPE) DSL modem;
   a pedestal
   a plurality of wires comprising:
   a first active DSL loop coupling the modem and the pedestal, wherein the first active DSL loop is used for transmission arid reception of DSL signals between the modem and pedestal; and
   a second loop coupling the modem and the pedestal, wherein the second loop is a member of the same drop segment as the first active DSL loop, and wherein the second loop is to collect interference data from interference sources that affect the first active DSL loop and the second loop; and
   wherein the modem comprises an interference canceller coupled to the first active DSL loop and to the second loop to subtract from the first active DSL loop the interference data collected from the second loop and thereby remove at least a portion of the interference noise from the first active DSL loop.

9. The system of claim 8 wherein the second loop is an inactive DSL loop.

10. The system of claim 8 wherein the plurality of wires further comprises an antenna wire coupled to the CPE DSL modem, wherein the antenna wire is configured to function as an antenna to collect interference data from an additional interference source and wherein the interference canceller further subtracts interference data collected from the antenna wire from the first active DSL loop.

11. The system of claim 10 wherein the additional interference source includes a crosstalk source generating crosstalk interference affecting signals on the first active DSL loop.

12. The system of claim 8 wherein the interference sources include a RF interference source generating RF interference affecting signals on the first active DSL loop and wherein the second loop collects RF interference data from the RF interference source.

13. The system of claim 8 wherein the interference canceller is configured for frequency domain processing and to subtract RF interference data from the first active DSL loop using the RF interference data in a frequency domain in accordance with the frequency domain processing.

14. The system of claim 8 wherein the second loop is an active POTS (Plain Old Telephone Service) line.

15. The system of claim 14 further comprising a microfilter between the second loop and a downstream voice telephony subscriber equipment.

16. In a system including a customer premises equipment (CPE) DSL modem coupled to a pedestal via a DSL wired loop to receive a DSL signal from the pedestal, a method comprising:

receiving the DSL signal at the CPE DSL modem from the pedestal coupled to the CPE DSL modem via the DSL wired loop;

receiving interference noise from a second wired loop coupled between the pedestal and the CPE DSL modem the interference noise being in a frequency range used to carry the DSL signal on the DSL wired loop, the DSL wired loop and the second wired loop both being part of a single drop segment coupling the CPE DSL modem and the pedestal; and subtracting from the received signal on the DSL wired loop the received interference noise collected on the second wired loop and thereby removing at least a portion of the interference noise from the DSL wired loop.

17. The method of claim 16 wherein the second wired loop is a second DSL loop.

18. The method of claim 17 wherein the second DSL loop is active.

19. The method of claim 17 wherein the second DSL loop is inactive.

20. The method of claim 16 further comprising receiving additional interference noise from an RF antenna and subtracting the received additional noise from the received signal on the DSL wired loop.

21. The method of claim 16 wherein the interference noise comprises AM radio interference.

22. The method of claim 16 wherein subtracting the received interference noise is performed by an adaptive filter in the CPE DSL modem.

23. The method of claim 16 wherein the CPE DSL modem comprises time domain processing and further wherein subtracting the interference noise is performed using time domain processing in the DSL modem.

24. The method of claim 16 wherein the CPE DSL modem comprises frequency domain processing and further wherein subtracting the interference noise is performed using frequency domain processing in the DSL modem.

25. The method of claim 16 wherein receiving interference noise comprises receiving RF interference data.

26. The method of claim 16 wherein receiving interference noise comprises receiving crosstalk interference data.

27. The method of claim 16 wherein the second wired loop is an active POTS (Plain Old Telephone Service) line.

28. A system comprising:

a number, N, of twisted pair telephone loops contained in a common binder in a drop segment coupled to a Customer Premises Equipment (CPE) DSL modem from a common pedestal, wherein a first loop of the N twisted pair telephone loops is a DSL line to carry DSL data in a plurality of frequency ranges means for collecting interference data on one or more of the remaining N−1 twisted pair telephone loops relating to interference noise in at least one of the frequency ranges used to carry the DSL data on the DSL line, and means for canceling the interference noise coupled to the DSL line and the means for collecting interference data, the means for canceling interference noise configured to subtract the collected interference data from the DSL line and thereby remove at least a portion of the interference noise from the DSL line.

29. The system of claim 28 wherein the means for collecting interference data comprises a plurality of wires from the N−1 telephone loops and further wherein each wire receives interference noise affecting the DSL signals received by the CPE DSL modem on the first DSL line.

30. The system of claim 29 wherein a source of received interference noise is RF interference.

31. The system of claim 29 wherein a source of received interference noise is crosstalk.

32. The system of claim 29 wherein at least one of the plurality of wires from the N−1 telephone loops is an active POTS (Plain Old Telephone Service) line.

* * * * *